US012637073B2

(12) United States Patent
Matta et al.

(10) Patent No.: US 12,637,073 B2
(45) Date of Patent: May 26, 2026

(54) DRIVER-ASSISTANCE SYSTEM FOR CONTROLLING A VELOCITY OF A VEHICLE DURING AN APPROACH TO A TRAFFIC LIGHT

(71) Applicant: FEV Group GmbH, Aachen (DE)

(72) Inventors: Sherif Matta, Auburn Hills, MI (US); Hamzeh Alzu'bi, Auburn Hills, MI (US); Thomas Tasky, Auburn Hills, MI (US); Venkata Narayana Sri Lakshman Siddhartha Yedida, Auburn Hills, MI (US); Ajay Paudyal, Auburn Hills, MI (US)

(73) Assignee: FEV Group GmbH, Aachen (DE)

( * ) Notice: Subject to any disclaimer, the term of this patent is extended or adjusted under 35 U.S.C. 154(b) by 299 days.

(21) Appl. No.: 18/139,115

(22) Filed: Apr. 25, 2023

(65) Prior Publication Data

US 2024/0359687 A1      Oct. 31, 2024

(51) Int. Cl.
*B60W 30/14* (2006.01)
*G08G 1/0967* (2006.01)

(52) U.S. Cl.
CPC ....... *B60W 30/14* (2013.01); *G08G 1/096725* (2013.01); *G08G 1/096766* (2013.01); *B60W 2556/45* (2020.02)

(58) Field of Classification Search
CPC .............. B60W 30/14; B60W 2556/45; G08G 1/096725; G08G 1/096766
See application file for complete search history.

(56) References Cited

U.S. PATENT DOCUMENTS

| | | | | |
|---|---|---|---|---|
| 9,261,601 | B2 | 2/2016 | Ibrahim | |
| 12,103,563 | B2 * | 10/2024 | Ahn | B60W 50/029 |
| 2008/0086258 | A1 * | 4/2008 | Wall | G08G 1/081 |
| | | | | 701/117 |
| 2009/0207046 | A1 * | 8/2009 | Arrighetti | G06V 20/63 |
| | | | | 348/149 |
| 2009/0224942 | A1 * | 9/2009 | Goudy | G08G 1/164 |
| | | | | 340/905 |

(Continued)

FOREIGN PATENT DOCUMENTS

| | | |
|---|---|---|
| DE | 102019200348 A1 | 7/2020 |
| EP | 3342668 A2 | 4/2018 |
| WO | 2019245690 A1 | 12/2019 |

*Primary Examiner* — Peter D Nolan
*Assistant Examiner* — Wae L Louie
(74) *Attorney, Agent, or Firm* — Dinsmore & Shohl LLP

(57) ABSTRACT

The present disclosure relates to a driver-assistance system for controlling a velocity of a vehicle. The system having a receiver and a control system. The receiver is configured to receive traffic light data generated by a traffic light control unit for controlling a traffic light. The control system is configured to control the velocity of the vehicle dependent on the traffic light data. The traffic light data indicates a current phase of the traffic light. The control system is configured to control the velocity of the vehicle dependent on the traffic light data such that the vehicle stops in front of the traffic light when the current phase of the traffic light is a red phase and controls the velocity of the vehicle dependent on the traffic light data such that the vehicle reaches a prescribed target velocity when the current phase of the traffic light is a green phase.

13 Claims, 9 Drawing Sheets

(56) References Cited

U.S. PATENT DOCUMENTS

| | | | |
|---|---|---|---|
| 2015/0153735 A1* | 6/2015 | Clarke | B60W 30/18163 |
| | | | 701/301 |
| 2016/0215747 A1* | 7/2016 | Huber | F02D 29/02 |
| 2017/0116485 A1* | 4/2017 | Mullen | G08G 1/09626 |
| 2017/0178508 A1* | 6/2017 | Chiu | G08G 1/09626 |
| 2019/0354101 A1* | 11/2019 | Sujan | B60W 60/005 |
| 2020/0139969 A1* | 5/2020 | Jo | B60W 30/18 |
| 2020/0143674 A1* | 5/2020 | Wölfl | G08G 1/095 |
| 2024/0071222 A1* | 2/2024 | Sun | G08G 1/081 |
| 2024/0118096 A1* | 4/2024 | Kundu | B60L 53/12 |
| 2024/0359687 A1* | 10/2024 | Matta | G08G 1/096783 |

* cited by examiner

DRIVER-ASSISTANCE SYSTEM FOR CONTROLLING A VELOCITY OF A VEHICLE DURING AN APPROACH TO A TRAFFIC LIGHT

TECHNICAL FIELD

The present disclosure relates in general to the field of automated or semi-automated driven vehicles and, in particular, to a driver-assistance system for controlling a velocity of a vehicle and a method for assisting a driver of a vehicle in controlling a velocity of the vehicle.

BACKGROUND

Autonomous driving systems may utilize sensor data generated by various sensors of the vehicle in order to enhance the efficiency and the driving comfort of autonomously or semi-autonomously driven vehicles. For example, autonomous and semi-autonomous driving systems and methods for autonomous and semi-autonomous driving may assist a driver of the vehicle in a traffic situation in which the vehicle approaches a further vehicle, which may be located in front of the vehicle and may be stopped, using the sensor data. An adaptive cruise control (ACC) system may halt the vehicle behind the further vehicle in this case. Such a traffic situation may occur at an intersection where the further vehicle is stopped in front of the traffic light. Generally, there is a desire to enhance an efficiency and a scope of applications of driver-assistance systems, in particular at intersections and traffic lights.

SUMMARY

Various embodiments provide a driver-assistance system for controlling a velocity of a vehicle and a method for controlling a velocity of a vehicle by a driver-assistance system as described by the subject matter of the independent claims. Advantageous embodiments are described in the dependent claims. Embodiments of the present disclosure can be freely combined with each other if they are not mutually exclusive.

In one aspect, the present disclosure relates to a driver-assistance system for controlling a velocity of a vehicle. The driver-assistance system includes a receiver and a control system. The receiver is configured to receive traffic light data generated by a traffic light control unit for controlling a traffic light. The control system is configured to control the velocity of the vehicle dependent on the traffic light data.

The control system and/or a driver-assistance system that may be independent or may include the control system, may include an electronic control unit (ECU) for processing various data described herein and for controlling the velocity of the vehicle. The ECU may include one or more processors, and other components, for example one or more memory modules that stores logic that is executable by the one or more processors. Each of the one or more processors may be a controller, control unit, an integrated circuit, a microchip, central processing unit (CPU) or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, etc., that may be compiled or assembled into computer-executable instructions and/or a computer program product, and storage on the one or more memory modules. Alternatively, the computer-executable instructions may be written in our hardware description language, such as logic implemented via either a field programmable gate array (FPGA) configuration or an application specific integrated circuit (ASIC), all their equivalents. Accordingly, the methods and/or processes described herein may be implemented in any conventional computer programming language, as pre-programmed hardware elements, or as a combination of hardware and software components.

The traffic light data indicates a current phase of the traffic light. Furthermore, the control system is configured to control the velocity of the vehicle dependent on the traffic light data such that the vehicle stops in front of the traffic light wherein when the current phase of the traffic light is a red phase. In addition, the control system is configured to control the velocity of the vehicle dependent on the traffic light data such that the vehicle reaches a prescribed target velocity wherein when the current phase of the traffic light is a green phase.

In another aspect, the present disclosure relates to a method for controlling a velocity of a vehicle by a driver-assistance system. The driver-assistance system includes a receiver and a control system. The method includes the following steps. In a first step, traffic light data generated by a traffic light control unit for controlling a traffic light is received. The traffic light data is received by the receiver. The traffic light data indicates a current phase of the traffic light. In a second step, the velocity of the vehicle is controlled dependent on the traffic light data by the control system such that the vehicle stops in front of the traffic light wherein when the current phase of the traffic light is a red phase, or the velocity of the vehicle is controlled dependent on the traffic light data by the control system such that the vehicle reaches a prescribed target velocity wherein when the current phase of the traffic light is a green phase.

In another aspect, the present disclosure relates to a traffic control system includes a traffic light and a roadside unit with a transmitter. The roadside unit is arranged at a distance from the traffic light in the opposite direction of travel. The transmitter is configured to send traffic light data generated of a traffic light control unit. The traffic light data is configured for controlling the traffic light. The traffic control system includes a driver-assistance system for controlling a velocity of a vehicle. The driver-assistance system includes a receiver and a control system and the receiver is configured to receive the traffic light data from the transmitter. The control system is configured to control the velocity of the vehicle dependent on the traffic light data, wherein the traffic light data indicates a current phase of the traffic light. The control system is configured to control the velocity of the vehicle dependent on the traffic light data such that the vehicle stops in front of the traffic light wherein when the current phase of the traffic light is a red phase and to control the velocity of the vehicle dependent on the traffic light data such that the vehicle reaches a prescribed target velocity wherein when the current phase of the traffic light is a green phase.

The proposed driver-assistance system, the traffic control system and the proposed method may allow to control the velocity of the vehicle when the vehicle approaches the traffic light even if there is no further vehicle in front of the vehicle. By controlling the velocity of the vehicle dependent on the traffic light data by the control system, the current phase of the traffic light can be taken into account in order to save fuel or to enhance the efficiency of the vehicle.

BRIEF DESCRIPTION OF THE SEVERAL VIEWS OF THE DRAWINGS

In the following, embodiments of the present disclosure are explained in greater detail, by way of example only, making reference to the schematic drawings in which.

DETAILED DESCRIPTION

Figures 1, 2, 3:
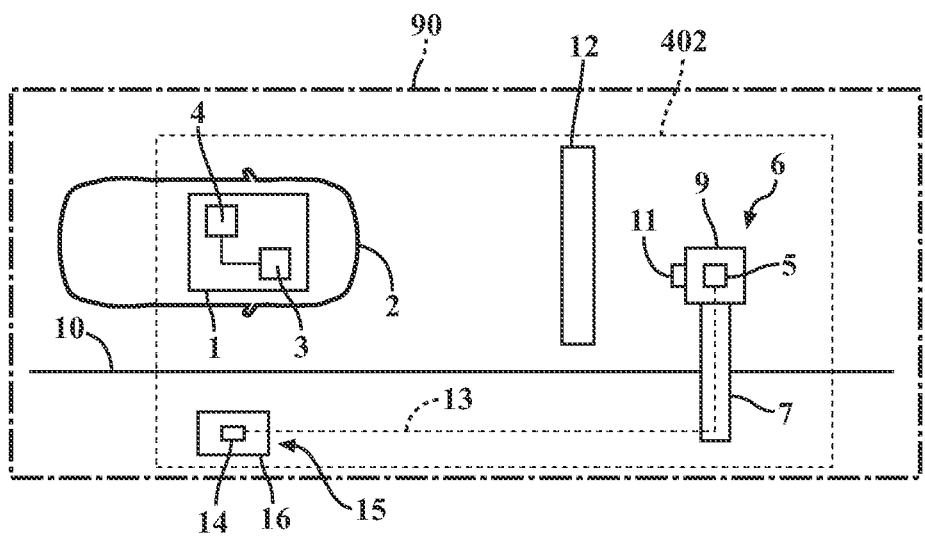
FIG. 1 illustrates a vehicle with a driver-assistance system for assisting a driver of a vehicle in controlling a velocity of the vehicle.
FIG. 2 depicts the driver-assistance system shown in FIG. 1 approaching a traffic light.
FIG. 3 shows the driver-assistance system shown in FIG. 1 approaching the traffic light shown in FIG. 2 and passing by a roadside unit.

The control system of the driver-assistance system may include one or more control units or may be designed as a single control unit. In one example, the control system may be designed in the form of an electronic control unit (ECU).

The driver-assistance system may be configured to assist a driver of the vehicle in following a further vehicle that is in front of the vehicle by controlling a drive unit and a brake system of the vehicle. For example, the driver-assistance system may detect the further vehicle dependent on sensor data. The sensor data may include lidar signals generated by one or more lidar sensors of the driver-assistance system and/or images generated by one or more cameras of the driver-assistance system. In addition, the control system may be adapted to determine a current distance between the further vehicle and the vehicle and a velocity of the further vehicle dependent on the sensor data and to control the drive unit and the brake system such that the current distance between the further vehicle and the vehicle reaches a safety distance. The control system may calculate the safety distance dependent on the velocity of the further vehicle.

Furthermore, the driver-assistance system may be configured to assist a driver of the vehicle such that the vehicle keeps or reaches the target velocity by controlling the drive unit, and in particular the brake system. To realize this, the control system may be configured to control the drive unit, particularly via a control unit of the drive unit, and to control the brake system, particularly via a control unit of the brake system, dependent on the velocity of the vehicle and the target velocity. The control system may also control the drive unit and the brake system dependent on the sensor data such that the vehicle reaches the target velocity.

For example, the control system may check whether a lane in which the vehicle travels is clear by analyzing the sensor data. In one example, the control system may include an object recognition module for recognizing the further vehicle in the environment, in particular in the lane in front of the vehicle, dependent on the sensor data. If the lane is clear or the detected further vehicle in front of the vehicle drives at a speed that is equal or greater than the target velocity, then the control system may control the drive unit such that the vehicle reaches the target velocity. The target velocity may be prescribed by the driver or a speed limit in one example.

The proposed driver-assistance system may allow to take into account the current phase of the traffic light when controlling the vehicle by the control system in order to save fuel, to move faster with the vehicle and/or to enhance the efficiency of the vehicle.

Fuel may be saved by reducing a drive torque of the drive unit dependent on the traffic light data by the control system. Wherein when the current phase of the traffic light, in the following also referred to as current phase, is the red phase, the control system may reduce the velocity by reducing the drive torque in response to a receiving and a processing of the traffic light data. In particular, the receiver may be set up to send the traffic light data to the control system in response to receiving the traffic light data.

The driver-assistance system may be configured to detect the traffic light and/or a stop line, which may be located in front of the traffic light, by the sensor data. For example, the control system may be configured to detect the traffic light and/or the stop line dependent on the images generated by the camera and/or dependent on the lidar signals, in particular various point clouds, generated by the one or more lidar sensors and/or dependent on radar signals generated by one or more radar sensors of the driver-assistance system. A detection of the traffic light and/or the stop line may include determining a current distance between the vehicle, in particular a transmitter of the driver-assistance system, and the traffic light or the stop line respectively, in the following also referred to as stop line distance. For example, the control system may be adapted to calculate the stop line distance dependent on the lidar signals. In one instance, the control system may be configured to control the velocity by controlling the drive unit and the brake system dependent on the stop line distance such that the vehicle stops in front of the traffic light. In the context of this disclosure, stopping in front of the traffic light may involve stopping in front of the stop line in one example.

In most cases, a range for receiving the traffic light data by the receiver may be greater than a maximal distance from which the current phase is recognizable with satisfactory accuracy by the sensor data, particularly by the camera. The earlier the control system may obtain an information about the current phase, the sooner the control system may be able to start controlling the drive unit and/or the brake system such that the velocity can be reduced. Thus, the proposed driver-assistance system may allow to save fuel because the drive torque may be reduced earlier compared to a driver-assistance system using just the sensor data for controlling the velocity.

In addition, the efficiency of the vehicle may be increased by controlling the velocity dependent on the traffic light data because the traffic light data is generated by the traffic light control unit. If the traffic light data is generated by the traffic light control unit, the information about the current phase given by the traffic light data is certainly true. This is due to the fact that the traffic light is controlled by the traffic light control unit using the traffic light data. However, recognizing the current phase by the camera may never give a result that is certainly true in any circumstances, especially considering varying weather conditions.

Wherein when the current phase is the green phase, the driver-assistance system may allow to reach the target velocity earlier compared to an application according to which the receiver is not configured to receive the traffic light data. For the purpose of this argument, it is assumed that, in some instances, the velocity of the vehicle is less than the target velocity when the vehicle approaches the traffic light during the green phase. The control system may increase the drive torque in response to the receiving and the processing of the traffic light data wherein when the current phase is the green phase. As the range for receiving the traffic light data by the receiver may be greater than the maximal distance from which the current phase is recognizable with satisfactory accuracy by the sensor data, the drive torque may be increased sooner compared to the application according to which the receiver is not configured to receive the traffic light data. Thus, a faster and more fluent driving may be possible using the driver-assistance system.

The traffic light control unit or a further transmitter that is electrically connected to the traffic light control unit may be configured to send the traffic light data via radio. It is understood that the traffic light data changes over time in accordance with a change of the current phase of the traffic light. The traffic light control unit may control the traffic light based on the information contained in the traffic light data.

According to one embodiment, the traffic light data may include an information about a remaining duration of the green phase wherein when the current phase of the traffic light is the green phase or an information about a remaining duration of the red phase wherein when the current phase of the traffic light is the red phase. According to this embodiment, the control system may be configured to control the velocity of the vehicle dependent on the remaining duration of the green phase wherein when the current phase of the traffic light is the green phase or dependent on the remaining duration of the red phase wherein when the current phase of the traffic light is the red phase.

The traffic light data may include the information about the remaining duration of the green phase, in the following also referred to as green phase information, in different variants.

According to one variant, the traffic light data may provide the green phase information in the form of a first single value indicating the remaining duration of the green phase. The first single value may represent the remaining seconds of the green phase according to one example.

According to a further variant, the traffic light data may include a second value specifying a fraction of a total duration of the green phase. The second value may lie in an interval between 0.0 and 1.0. The fraction may specify an elapsed portion of the total duration of the green phase or a remaining portion of the total duration of the green phase. According to this variant, a schedule according to which the traffic light is operated dependent on a current time may be stored on a memory of the control system. The schedule may indicate the total duration of the green phase at the current time. It is understood that in terms of accuracy in the seconds range, a clock of the traffic light control unit and a clock of the control system may not run synchronously with each other. However, with respect to an accuracy in the minute range, the clock of the traffic light control unit may be synchronous with the current time, and the clock of the control system may be synchronous with the current time. Thus, in one example, the current time may be a time of the clock of the control system having an accuracy in the minute range.

Alternatively, the total duration of the green phase may be constant over time and an information about the total duration of the green phase may be stored on the memory of the control system. In this case, a schedule is not needed. In another example, the traffic light data may include the information about the total duration of the green phase and the second value.

In summary, the green phase information may be designed such that the remaining duration of the green phase as a value with an accuracy in the range of seconds may be directly obtained by reading the green phase information or such that the remaining duration of the green phase may be calculated on the basis of the green phase information with an accuracy in the range of seconds by the control system. The same may apply for the information about the remaining duration of the red phase, in the following also referred to as red phase information.

Thus, according to one variant, the traffic light data may provide the red phase information in the form of a third single value indicating the remaining duration of the red phase. The third single value may represent the remaining seconds of the red phase, in one example.

According to a further variant, the traffic light data may include a fourth value specifying a fraction of a total duration of the red phase. The fourth value may lie in an interval between 0.0 and 1.0. The fraction may specify an elapsed portion of the total duration of the red phase or a remaining portion of the total duration of the red phase. According to this variant, the schedule according to which the traffic light is operated dependent on the current time may be stored on the memory of the control system. The schedule may indicate the total duration of the red phase at the current time.

Alternatively, the total duration of the red phase may be constant over time and an information about the total duration of the red phase may be stored on the memory of the control system. In this case, the schedule is not needed. In another example, the traffic light data may include the information about the total duration of the red phase and the fourth value.

In some instances, the control system may be configured to control the velocity of the vehicle dependent on the remaining duration of the green phase wherein when the current phase of the traffic light is the green phase such that an average velocity of the vehicle is greater than a quotient of the stop line distance as the dividend and the remaining duration of the green phase as the divisor. As a consequence, the vehicle may reach the traffic light when the current phase is still the green phase and therefore fuel may be saved. In one example, the control system may generate target values or a target function according to which the velocity of the vehicle should be adapted over time in a future time interval. The future time interval may start when the control system receives the traffic light data and may end when the vehicle passes the traffic light.

In other instances, the control system may be configured to control the velocity of the vehicle dependent on the remaining duration of the red phase wherein when the current phase of the traffic light is the red phase such that the velocity is reduced in a way that the vehicle reaches the stop line at a moment when the current phase changes from the red phase to the green phase. Particularly, the control system may be configured to control the velocity of the vehicle dependent on the remaining duration of the red phase wherein when the current phase of the traffic light is the red phase such that the average velocity of the vehicle is less than a quotient of the stop line distance as the dividend and the remaining duration of the red phase as the divisor. As a consequence, the vehicle may reach the traffic light when the current phase switches from the red phase to the green phase and therefore fuel may be saved.

According to one embodiment, the receiver is configured to receive the traffic light data using a short-range communication standard. A communication according to the short-range communication standard may be feasible within a maximum range. The maximum range may lie in a range between 300 and 500 meters in one example. Using the short-range communication standard may have the advantage that the traffic light data may be assigned with a very high degree of certainty, in most cases with 100 percent probability, to the traffic light that is the closest in the environment of the vehicle. In other words, the probability may be very high that the above mentioned traffic light is the closest in the environment of the vehicle if the receiver is operated such that it uses the short-range communication standard. If it is certain that the traffic light is the closest in the environment of the vehicle, then the traffic light data does not need to include an identifier for identifying the traffic light among a set of traffic lights. Furthermore, the control system does not need to verify that traffic light is the closest in the environment of the vehicle. This saves computational time and may therefore enhance the efficiency of the driver-assistance system.

In one example, the short-range communication standard may be the dedicated short-range communication (DSRC) standard. The DSRC is specifically designed for automotive use. A usage of the DSRC is restricted to a specified set of protocols and standards, such as the SAE J2735 standard, wherein SAE refers to the Society of Automotive Engineers. Using the DSRC standard may involve using a spectrum of 75 MHz in the 5.9 GHz band for sending and receiving messages. A communication according to the DSRC standard may be feasible within a maximum range of about 300 meters.

According to a further embodiment, the receiver may be configured to receive local map data specifying an environment of the traffic light. According to this embodiment, the control system may be configured to calculate a length of a driving path to the traffic light dependent on the local map data. In addition, the control system may be configured to control the velocity of the vehicle dependent on the calculated length of the driving path. The driving path starts at a current position of the vehicle and may end in front of the traffic light, for example in front of the stop line.

The local map data may provide dimensions of elements of an intersection at which the traffic light is located, such as dimensions of the stop line, a distance between the stop line and the traffic light and/or a width of a road on which the vehicle drives to the traffic light. The local map data may be more accurate than further map data available for the control system independently of a use of data received by the receiver. For example, the local map data may indicate a distance between the stop line and a corner of the intersection at which the traffic light is located. This information may not be provided by the further map data in one example. The further map data may be map data of a navigation system of the vehicle according to one example. The local map data may indicate dimensions of curves of the road leading to the traffic light, wherein these dimensions of the curves may be not provided by the further map data.

Hence, the local map data may allow to calculate the length of the driving path more accurately. This may reduce the risk that the control system cannot halt the vehicle in front of the stop line. Thus, the efficiency of the driver-assistance system may be increased by providing the local map data through the traffic light data. Furthermore, a chance that the vehicle reaches the traffic light before the current phase changes from the green phase to the red phase may be higher if the control system determines the distance between the vehicle and the traffic light dependent on the local map data.

According to another embodiment, the receiver may be configured to receive the traffic light data from a roadside unit wherein when the receiver passes by the roadside unit. The roadside unit may be located next to the road at a distance from the traffic lights, in the following also referred to as roadside unit distance. According to this embodiment, the above mentioned further transmitter may be arranged inside the roadside unit. The roadside unit distance may be greater than 10 meters according to one example. The receiver may be able to receive the traffic light data when the receiver, in particular the vehicle, passes the roadside unit. In one example, the receiver may be oriented towards the roadside when the receiver is installed in the vehicle for enabling the receiver to receive the traffic light data from the roadside unit.

FIG. 1 depicts an exemplary driver-assistance system 1 of the driver-assistance system described above for controlling a velocity of a vehicle 2. The driver-assistance system 1 includes a receiver 3 and a control system 4. The receiver 3 is configured to receive traffic light data generated by a traffic light control unit 5 for controlling a traffic light 6 as shown in FIG. 2 and FIG. 3. The receiver 3, the control system 4 and the traffic light 6 may each represent an example of the above described receiver, control system and traffic light respectively. Thus, the control system 4 may be configured to control the velocity of the vehicle 2 dependent on the traffic light data. The traffic light data indicates a current phase of the traffic light 6. The control system 4 is configured to control the velocity of the vehicle 2 dependent on the traffic light data such that the vehicle 2 stops in front of the traffic light 6 wherein when the current phase of traffic light 6 is a red phase. Furthermore, the control system 4 is configured to control the velocity of the vehicle 2 dependent on the traffic light data such that the vehicle 2 reaches a prescribed target velocity wherein when the current phase of the traffic light 6 is a green phase.

FIG. 2 shows a variant according to which the receiver 3 may receive the traffic light data from a first transmitter 8, which may be arranged inside the traffic light 6. The first transmitter 8 may represent an example of the further transmitter mentioned above. The traffic light 6 may include a housing 9 in which the traffic light control unit 5 is mounted for controlling the traffic light 6. The traffic light 6 may further include a supporting device 7 for supporting the housing 9 above a road 10 on which the vehicle 2 drives. The supporting device 7 may be designed in the form of a pole in one example. The housing 9 may support bulbs for indicating the known traffic light signals, such as green, red and yellow. A red bulb 11 for indicating the red phase of the traffic light 6 is shown in FIG. 2 and FIG. 3. The other bulbs, i.e. a green bulb 52 for indicating the green phase and a yellow bulb 53 for indicating a yellow phase of the traffic light 6, are not shown in FIG. 2 and FIG. 3 as both FIG. 2 and FIG. 3 show a top view of the vehicle 2 and the traffic light 6. FIG. 2 and FIG. 3 also depict a stop line 12. The vehicle 2 is supposed to stop in front of the stop line 12 if the current phase of the traffic light 6 is the red phase. In this case the red bulb 11 is switched on by the traffic light control unit 5.

FIG. 3 depicts a variant according to which the receiver 3 receives the traffic light data from a second transmitter 14. According to this variant, the second transmitter 14 is located outside an infrastructure of the traffic light 6. The infrastructure of the traffic light 6 may include the housing 9 and the supporting device 7. In particular, the second transmitter 14 is located in a distance from the traffic light 6 in the opposite direction of travel. This distance may be greater than 10 meters in one example. The second transmitter 14 may be mounted inside a roadside unit 15. The roadside unit 15 may at least include the second transmitter 14 and a further housing 16 for covering the second transmitter 14. FIG. 3 indicates an electrical connection 13 between the second transmitter 14 and the traffic light control unit 5. The electrical connection 13 is illustrated by a first dashed line where the electrical connection 13 passes through the supporting device 7 and by a second dashed line where the electrical connection 13 passes through the roadside unit 15.

In the following, it is assumed that the current phase of the traffic light 6 is the red phase during a first time span 41, and that the current phase of the traffic light 6 is the green phase during a second time span 42, both shown in a first chart 44 in FIG. 4. The first time span 41 and the second time span 42 are shown each as a part of a timeline 40 of the first chart 44. According to the example given in FIG. 4, the green phase of the traffic light 6 may be indicated by the value "2"

and the red phase of the traffic light 6 may be specified by the value "1". The values "1" and "2" are plotted on a first y-axis of the first chart 44. A transition point 43 may represent a moment at which the current phase of the traffic changes from the red phase to the green phase.

In the context of this disclosure, the traffic light data may be understood as an information specifying at least the current phase of the traffic light 6, in the following also referred to as current phase. The traffic light data may be expressed in various variants. For example, the traffic light data may describe the current phase as depicted in FIG. 4. It is understood that a codification for specifying the red phase and the green phase according to FIG. 4 is selected randomly. According to a further example, the red phase could also be represented by the value "1", and the green phase could be represented by the value "0" in this further example.

In another example, the traffic light data may indicate a state of the red bulb 11 and a state of the green bulb 52, and in particular a state of the yellow bulb 53. This kind of representation of the traffic light data may also specify a state of a first output channel 31 of the traffic light control unit 5 for controlling the red bulb 11, a state of a second output channel 32 of the traffic light control unit 5 for controlling the green bulb 52, and a state of a third output channel 33 of the traffic light control unit 5 for controlling the yellow bulb 53.

Figure 5:
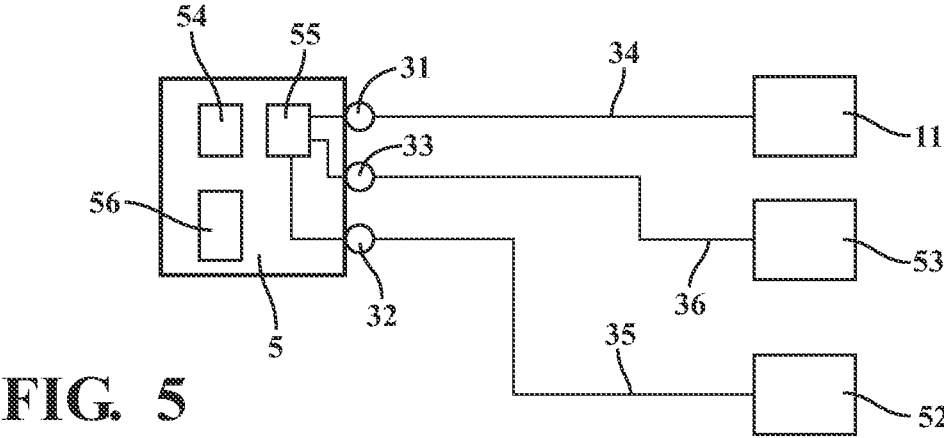
FIG. 5 represents a control unit of the traffic light shown in FIG. 2 or FIG. 3 for controlling the traffic light.

According to an example shown in FIG. 5, a first control line 34 may connect the red bulb 11 with the first output channel 31, a second control line 35 may connect the green bulb 52 with the second output channel 32, and a third control line 36 may connect the yellow bulb 53 with the third output channel 33. In one example, the traffic light control unit 5 may include an internal clock 54 and a logic circuit 55 for controlling the state of the first output channel 31 and the state of the second output channel 31, and particularly the state of the third output channel 33, during the first time span 41 and the second time span 42. The internal clock 54 may represent one example of the above mentioned clock of the above described traffic light control unit.

The logic circuit 55 may set the state of the first output channel 31, the second output channel 31, and particularly the third output channel 33, respectively either to a high voltage level or a low voltage level dependent on a current time of the internal clock 54 and a schedule 56 according to which the traffic light 6 may be operated. The current time of the internal clock 54 may be accurate in the range of minutes.

Figure 6:
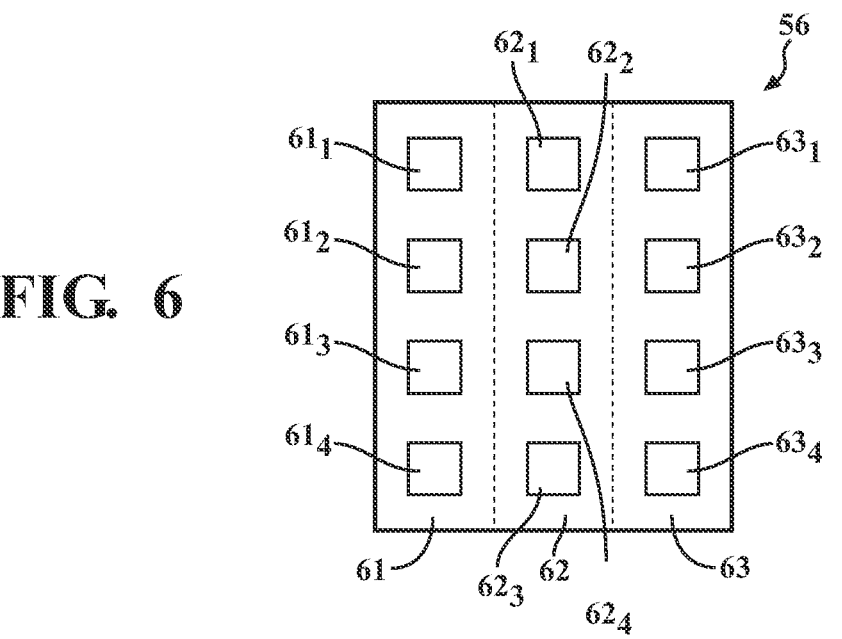
FIG. 6 illustrates a schedule for operating the traffic light shown in FIG. 2 or FIG. 3.
Figures 7, 8:
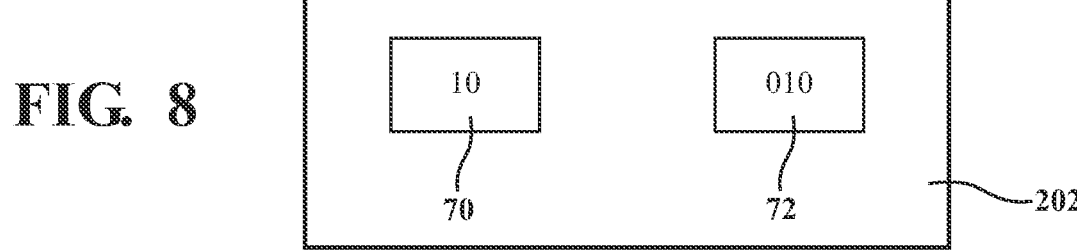
FIG. 7 depicts a first message including information about a current phase of the traffic light shown in FIG. 2 or FIG. 3 wherein when the current phase is a red phase.
FIG. 8 illustrates a second message including information about the current phase of the traffic light shown in FIG. 2 or FIG. 3 wherein when the current phase is a green phase.

FIG. 6 depicts one example of the schedule 56. According to this example, the schedule 56 may include a first 61 column, wherein each element of the first column 61 represents a respective starting time of a respective day section. Furthermore, the schedule 56 may include a second column 62 indicating a respective duration of the red phase during the respective day section. Analogously, the schedule 56 may include a third column 63 indicating a respective duration of the green phase during the respective day section.

In order to give an example, a first element $61_1$ of the first column 61 may have the value "7" indicating that a starting time of a first day section may be 7 o'clock. A second element $61_2$ of the first column 61 may have the value "11" indicating that a starting time of a second day section may be 11 o'clock. A value of a first element $62_1$ of the second column 62 may be "60" indicating that a duration of the red phase during the first day section may be 60 seconds. A value of a first element $63_1$ of the third column 63 may be "50"

indicating that a duration of the green phase during the first day section may be 50 seconds. A value of a second element $62_2$ of the second column $62$ may be "90" indicating that a duration of the red phase during the second day section may be 90 seconds. A value of a second element $63_2$ of the third column $63$ may be "80" indicating that a duration of the green phase during the second day section may be 80 seconds.

Analogously, a third element $61_3$ and a fourth element $61_4$ of the first column $61$ may indicate a starting time of a third and fourth day section respectively. Furthermore, a third element $62_3$ and of a fourth element $62_4$ of the second column $62$ and a third element $63_3$ and of a fourth element $63_4$ of the third column $63$ may indicate a duration of the red phase and the green phase during the third day section and the fourth day section respectively.

The logic circuit $55$ may determine a current day section according to the current time of the internal clock $54$. In one example, the logic circuit $55$ may set the above mentioned total duration of the red phase equal to the respective duration of the red phase indicated by the respective day section of the schedule $56$, wherein the respective day section matches the current day section. Similarly, the logic circuit $55$ may set the above mentioned total duration of the green phase equal to the respective duration of the green phase indicated by the respective day section of the schedule $56$.

In one example, the logic circuit $55$ may apply the high voltage level to the first output channel $31$ for a duration equal to the total duration of the red phase to generate the red phase of the traffic light $6$. Analogously, the logic circuit $55$ may apply the high voltage level to the second output channel $32$ for a duration equal to the total duration of the green phase to generate the green phase of the traffic light $6$. In between, the logic circuit $55$ may switch the high voltage level to the third output channel $33$ to generate a yellow phase of the traffic light $6$ in one example.

In one example, the traffic light data may be represented in the form of a binary number including three bits. A first bit of the binary number may indicate the state of the red bulb $11$. If the red bulb $11$ is switched on, the first bit may be set to "1", and if the red bulb $11$ is switched off, the first bit may be set to "0". Analogously, a second bit of the binary number may indicate the state of the green bulb $52$. If the green bulb $52$ is switched on, the second bit may be set to "1", and if the green bulb $52$ is switched off, the second bit may be set to "0". Analogously, a third bit of the binary number may indicate the state of the yellow bulb $53$. If the yellow bulb $53$ is switched on, the third bit may be set to "1", and if the yellow bulb $53$ is switched off, the third bit may be set to "0".

Thus, following the example shown in FIG. $4$, the traffic light control unit $5$, in particular the logic circuit $55$, may generate the traffic light data in the form of a first binary number $71$ having the value "100" during the first time span $41$. The first binary number $71$ indicates that the first output channel $31$ is set to the high voltage level and therefore the red bulb $11$ is switched on as the first bit of the first binary number $71$ is equal to one. The second output channel $32$ and the third output channel $33$ is set to the low voltage level, as indicated by the second and the third bit of the first binary number $71$, which are each equal to zero. The bits of the binary number are counted starting from the left in this case. During the second time span $42$, the traffic light control unit $5$ may generate the traffic data in the form of a second binary number $72$ having the value "010". The second binary number $72$ indicates that the second output channel $32$ is set to the high voltage level and therefore the green bulb $52$ is switched on as the second bit of the second binary number $72$ is equal to one. The first output channel $31$ and the third output channel $33$ is set to the low voltage level as indicated by the first and the third bit of the second binary number $72$, which are each equal to zero.

Now referring to FIG. $2$, the first transmitter $8$ may be electrically connected to the traffic light control unit $5$ via a further electrical connection $17$, illustrated by a dashed line, for transmitting the traffic data. The traffic light control unit $5$ may send the first binary number $71$ via the further connection $17$ to the first transmitter $8$ during the first time span $41$. Similarly, the traffic light unit $5$ may send the second binary number $72$ via this connection to the first transmitter $8$ during the second time span $42$.

The first transmitter $8$ may be configured to generate a first message $201$ in response to receiving the first binary number $71$. The first message $201$ may include a first identifier $70$ for identifying the first binary number $71$ as the information for specifying the current phase of the traffic light $6$ during the first time span $41$. Furthermore, the first message $201$ may include the first binary number $71$, which may represent the traffic data during the first time span $41$.

The first identifier $70$ may be designed in the form of a prescribed value, for example, the value "10" as indicated in FIG. $7$. The value of the first identifier $70$ may be prescribed according to an exemplary short-range communication standard which may represent one example of the above mentioned short-range communication standard. Thus, the exemplary short-range communication standard may be the dedicated short-range communication standard (DSRC). It is understood, that the value "10" of the first identifier $70$ is just chosen randomly for sake of simplicity.

Analogously, the first transmitter $8$ may be configured to generate a second message $202$ in response to receiving the second binary number $72$. The second message $202$ may include the first identifier $70$ for identifying the second binary number $72$ as the information for specifying the current phase of the traffic light $6$ during the second time span $42$. Furthermore, the second message $202$ may include the second binary number $72$, which may represent the traffic data during the second time span $42$.

The first transmitter $8$ may be configured to send out the first message $201$ repeatedly in regular first time intervals $21$, shown in FIG. $4$, during the first time span $41$. Similarly, the first transmitter $8$ may be configured to send out the second message $202$ repeatedly in regular second time intervals $22$ during the second time span $42$.

According to a further example, the traffic light control unit $5$ may be configured to generate the first message $201$ and the second message $202$. In this case, the first transmitter $8$ may not generate the messages $201$, $202$, but may receive these messages $201$, $202$ via the further connection $17$ instead. However, in either case, the first transmitter $8$ may be controlled by the traffic light control unit $5$ such that the first transmitter $8$ sends out the first message $201$ repeatedly within the first time intervals $21$ and the second message $202$ repeatedly within the second time intervals $22$.

Referring now to the variant depicted in FIG. $3$, the second transmitter $14$ may be designed similarly to the first transmitter $8$ according to one example. According to the example given in FIG. $3$, the traffic light control unit $5$ may send the first binary number $71$ via the connection $13$ to the second transmitter $14$ during the first time span $41$. Similarly, the traffic light unit $5$ may send the second binary number $72$ via this connection to the second transmitter $14$ during the second time span $42$.

The second transmitter 14 may be configured to generate the first message 201 in response to receiving the first binary number 71. Analogously, the second transmitter 14 may be configured to generate the second message 202 in response to receiving the second binary number 72.

Figure 4:
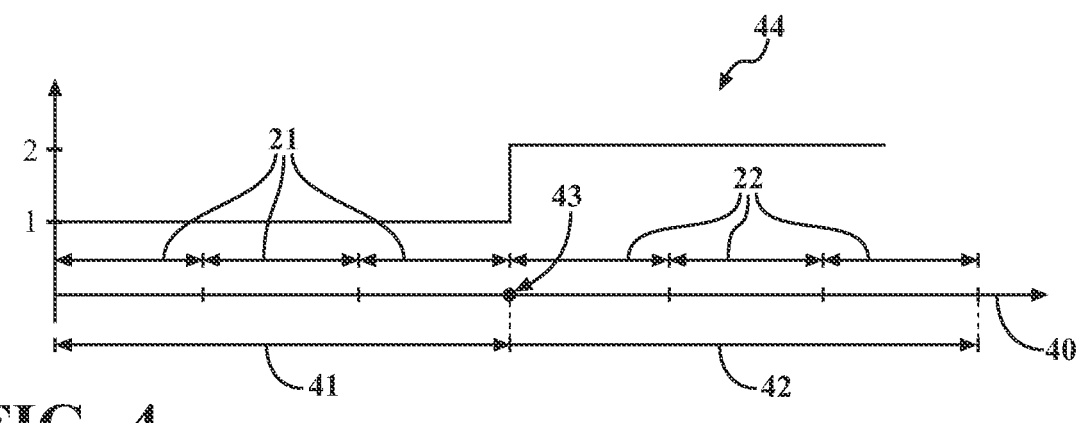
FIG. 4 depicts a time chart indicating a current phase over time of the traffic light shown in FIG. 2 or FIG. 3.

The second transmitter 14 may be configured to send out the first message 201 repeatedly in regular first time intervals 21, shown in FIG. 4, during the first time span 41. Similarly, the second transmitter 14 may be configured to send out the second message 202 repeatedly in regular second time intervals 22 during the second time span 42.

According to a further example, the second transmitter 14 may not generate the messages 201, 202, but may receive these messages 201, 202 via the connection 13 instead. However, in either case, the second transmitter 14 may be controlled by the traffic light control unit 5 such that the second transmitter 14 sends out the first message 201 repeatedly within the first time intervals 21 and the second message 202 repeatedly within the second time intervals 22.

The first transmitter 8 and the second transmitter 14 may respectively be constructed to send the first message 201 as well as the second message 202 via radio signals which are formed by electromagnetic waves. A wave length of these waves may be 5.9 GHz in one example. The first message 201 and the second message 202 may be receivable by the receiver 3 within a limited range, for example with a limited range 98 shown in FIG. 2. The limit of the range 98 may be 300 meters in one example.

Figure 9:
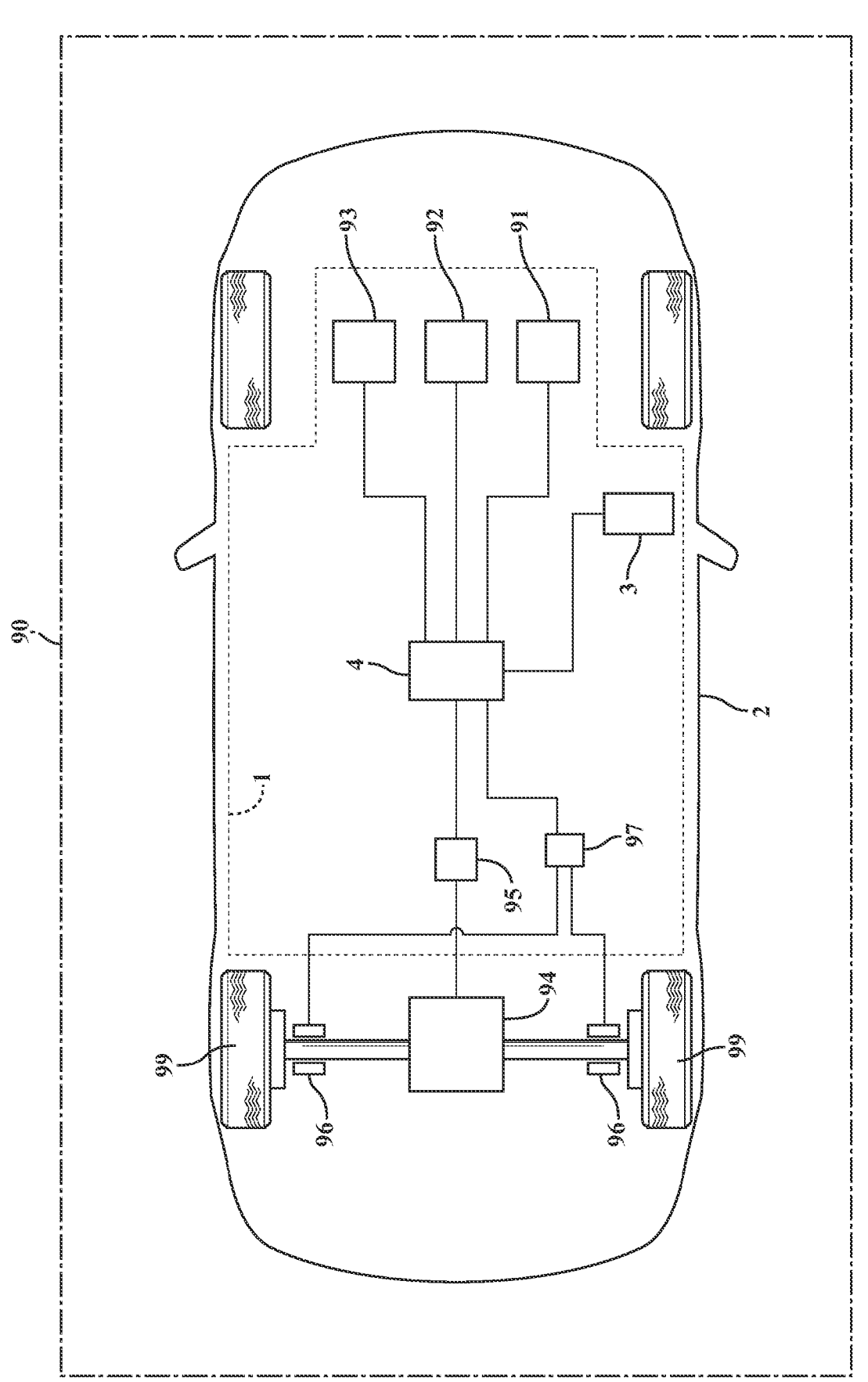
FIG. 9 depicts a further variant of the vehicle shown in FIG. 1 including a lidar system, a camera system, a radar system, a brake system and a drive unit.

FIG. 9 depicts a variant of the vehicle 2 and a variant of the driver-assistance system 1 shown in FIG. 1. According to this variant, the vehicle 2 may include a lidar system 91, a camera system 92 and a radar system 93. The lidar system 91 may include the above mentioned one or more lidar sensors. The lidar system 91 may be set up to generate the above mentioned lidar signals for detecting objects in an environment 90 of the vehicle 2. The camera system 92 may include the above mentioned one or more cameras. The camera system 92 may be configured to generate the above mentioned images for detecting the objects. The radar system 93 may include the above mentioned one or more radar sensor. The radar system 93 may be configured to produce the radar signals in order to capture the objects. The objects may include the traffic light 6, particularly the red bulb 11, in particular in a switched-on state, and the stop line 12. The objects may further include one or more further vehicles, not shown in the figures.

Furthermore, the vehicle 2 may include a drive unit 94, a drive control unit 95 for controlling the drive unit 94, a break system 96 and a brake control unit 97 for controlling the brake system 96. The drive unit 94 may be considered as an exemplary drive unit of the above mentioned drive unit. Similarly, the brake system 96 may be an exemplary brake system of the above mentioned brake system. The same may apply for the drive control unit 95 and the brake control unit 97 representing exemplarily the above mentioned drive control unit and the above mentioned brake control unit, respectively.

The control system 4 may be designed in the form of an electronic control unit (ECU). Generally, the control system 4 may be configured to control the drive unit 94 and the brake system 96, particularly the drive control unit 95 and the brake control unit 97, dependent on the above-mentioned sensor data in order to control the velocity of the vehicle 2. The sensor data may include at least the lidar signals, the images and/or the radar signals.

In particular, the control system 4 may control a drive torque of the drive unit 94 by sending a setpoint value for the drive torque, in the following also referred as drive torque setpoint, to the drive control unit 95. The drive control unit 95 may be configured to control the drive unit 94 dependent on the drive torque setpoint. In particular, the drive control unit 95 may control the drive unit 94 such that a drive torque of the drive unit 94 matches the drive torque setpoint. The drive torque of the drive unit 94 may be applied to rear wheels 99 of the vehicle 2.

Furthermore, the control system 4 may control a brake torque of the brake system 96 by sending a setpoint value of the break torque, in the following also referred to as brake torque setpoint, to the brake control unit 97. The brake control unit 97 may be configured to control the brake system 96 such that a current break torque of the brake system 96 applied to the rear wheels 99 matches the brake torque setpoint.

Figure 14:
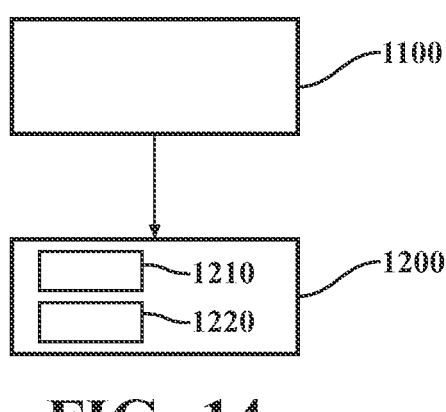
FIG. 14 shows steps of a method for controlling the velocity of the vehicle shown in FIG. 1 or FIG. 9 including a first step, a second step, a first sub-step and a second sub-step.

In the following, a first use case of the driver assistance system 1 according to which the vehicle 2 approaches the traffic light 6 and stops in front the traffic light 6 without any vehicle in front of it may be described. Furthermore, a second use case of the driver-assistance system 1 is explained wherein the vehicle 2 is controlled by the driver-assistance system 1 such that the vehicle 2 passes the traffic light 6 wherein when the current phase is the green phase. In both use cases, the above-mentioned method for controlling the velocity of the vehicle 2 may be performed by the driver-assistance system 1. In a first step 1100 of the method shown in FIG. 14, the traffic light data generated by the traffic light control unit 5 for controlling the traffic light 6 may be received by the receiver 3. As mentioned above, the traffic light data indicates the current phase of the traffic light 6. The traffic light data may be the first binary number 71 or the second binary number 72 in one example.

In a second step 1200 of the method, the velocity of the vehicle 2 may be controlled by the control system 4 dependent on the traffic light data. For example, in a first sub-step 1210 of the second step 1200, the velocity of the vehicle 2 may be controlled by the control system 4 dependent on the traffic light data such that the vehicle 2 stops in front of the traffic light 6 wherein when the current phase is the red phase. The first sub-step 1210 may be performed by the driver-assistance system 1 in the first use case. In a second sub-step 1220 of the second step 1200, the velocity of the vehicle 2 may be controlled by the control system 4 dependent on the traffic light data such that the vehicle 2 reaches the above mentioned prescribed target velocity wherein when the current phase of the traffic light is the green phase. The second sub-step 1220 may be performed by the driver-assistance system 1 in the second use case. The driver-assistance system 1 may either perform the first sub-step 1210 or the second sub-step 1220 dependent on the current phase of the traffic light 6.

When performing the method, the driver assistance system 1 may assist a driver sitting in the vehicle 2 in recognizing the red phase of the traffic light 6, in decelerating the vehicle 2, in performing a complete stop in front of the stop line 12 when the current phase is the red phase and in accelerating during the second time span 42 when the current phase is the green phase. This may be described in detail in the following.

Figure 10:
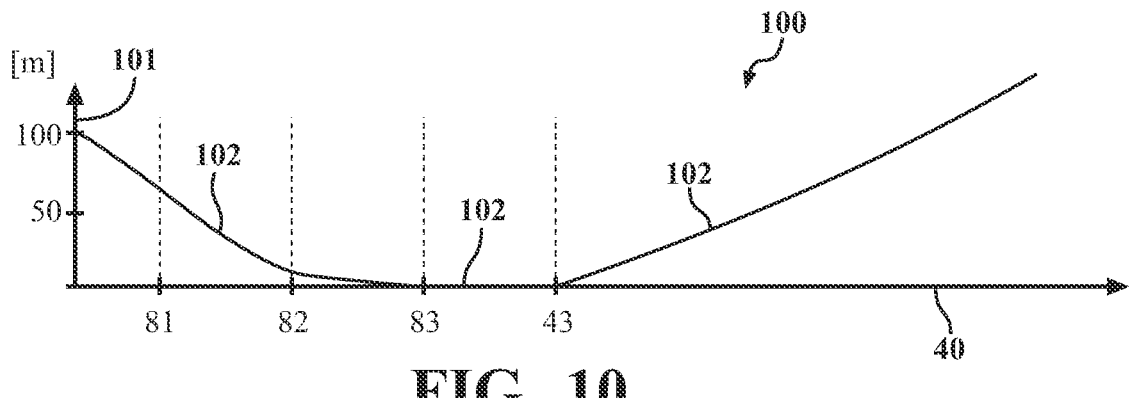
FIG. 10 illustrates a progression of a distance between the vehicle shown in FIG. 1 or FIG. 9 and a target object over time.

FIG. 10 depicts a second chart 100 including the timeline 40 of the first chart 44 and a second y-axis 101 indicating a distance between the vehicle 2 and the stop line 12, namely the above mentioned stop line distance. The unit of the second y-axis 101 is meter. The second chart 100 shows a progression of the stop line distance 102 over time.

Figure 11:
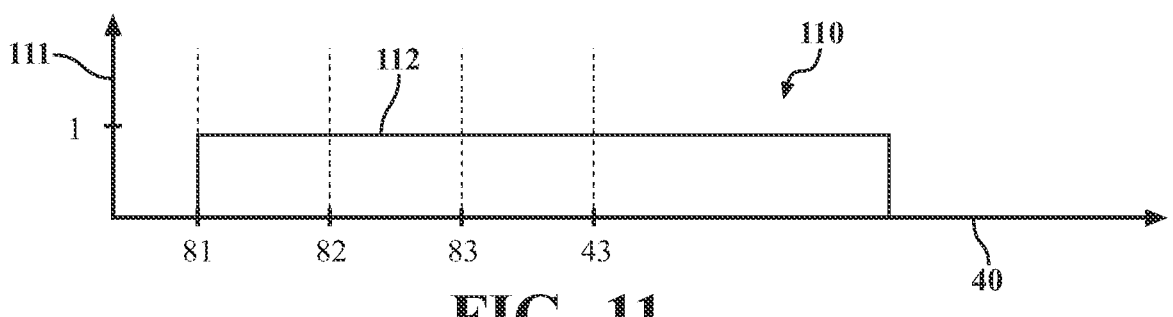
FIG. 11 illustrates a progression of a V2I-signal over time.

FIG. 11 depicts third chart 110 including the timeline 40 and a third y-axis 111, indicating a binary value of a vehicle-to-infrastructure (V2I) signal, in the following also referred to as V2I-signal. In one example, the V2I-signal may specify if the control system 4 uses an external signal which is send from an infrastructure in the environment 90 of the vehicle 2 for controlling the vehicle 2. If the binary value of the V2I-signal is set to 1, then the control system 4 may use the external signal. The external signal may include the radio signals sent out by the first transmitter 8 or the second transmitter 14 in one example. The third chart 110 depicts a progression of the value of the V2I-signal 112 over time.

Figure 12:
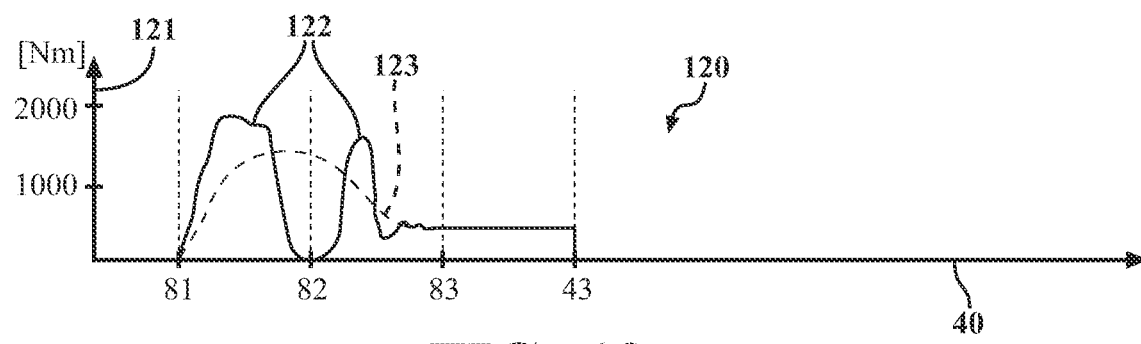
FIG. 12 illustrates a progression of a brake torque setpoint of the brake system shown in FIG. 9 over time.

FIG. 12 illustrates a fourth time chart 120 including the timeline 40 and a third y-axis 121 indicating the brake torque setpoint in Newton meter. The brake torque setpoint may be calculated by the control system 4 and sent to the brake control unit 97. The fourth chart 120 plots a progression of the brake torque setpoint 122 over time.

Figure 13:
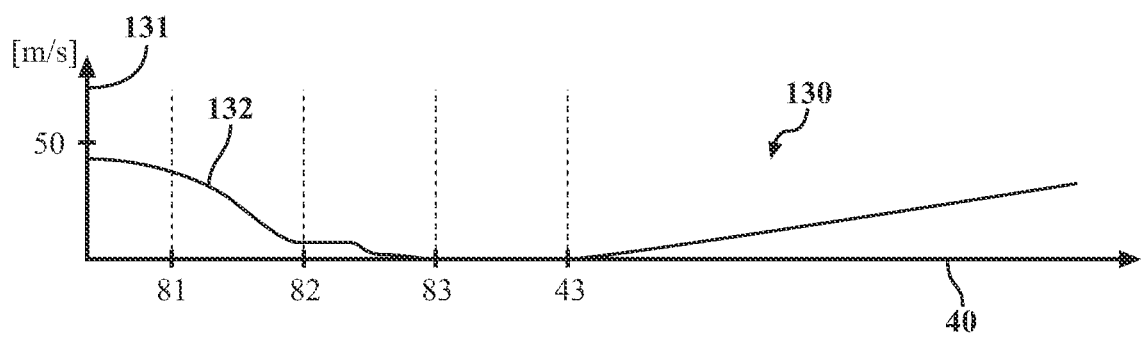
FIG. 13 depicts a progression of a velocity of the vehicle shown in FIG. 1 or FIG. 9 over time.

FIG. 13 displays a fifth chart 130 including the timeline 40 and a fourth y-axis 131 representing the velocity of the vehicle 2 indicated in meters per second. The fifth chart 130 demonstrates a progression 132 of the velocity of the vehicle 2 over time.

The charts 100, 110, 120, 130 show each a first point of time 81 at which the vehicle 2 is located within the range 98 so that the receiver 3 is able to receive the radio signals transmitted by the first transmitter 8. Thus, the receiver 3 may receive the first message 201 at the first point of time 81. Before the first point of time 81, the vehicle 2 may be located further away from the first transmitter 8 so that the receiver 3 may not be able to receive the radio signals from the first transmitter 8. According to the example with respect to FIG. 10, FIG. 11, FIG. 12 and FIG. 13, the limit of the range 98 may be approximately 60 meters. With respect to the first use case, it is assumed that the vehicle 2 approaches the traffic light 6, particularly a reception zone for receiving the radio signals from the first transmitter 8, during the first time span 41. The reception zone may be demarcated by a circle which indicates the range 98 in FIG. 2.

In response to receiving the radio signals, the control system 4 may set the value of the V2I-signal from "0" to "1" at the first point of time 81. Thus, from the first point of time 81, the control system 4 may start using the first message 201, particularly the first binary number 71, for controlling the vehicle 2. In one example, setting the V2I-signal from "0" to "1" may also involve increasing a frequency at which signals generated by the receiver 3 may be processed by the control system 4. Alternatively or in addition, the V2I-signal may be set if a frequency at which the radio signals from the first transmitter 8 are received by the receiver 3 is higher than a given threshold. This may enhance the chance that the vehicle 2 may be controlled in a reliable manner dependent on the radio signals sent out by the first transmitter 8. The V2I-signal having the status of "1" may indicate that a check whether the radio signals can be received reliably was successful. Such a check may be performed by the control system 4.

Figure 15:
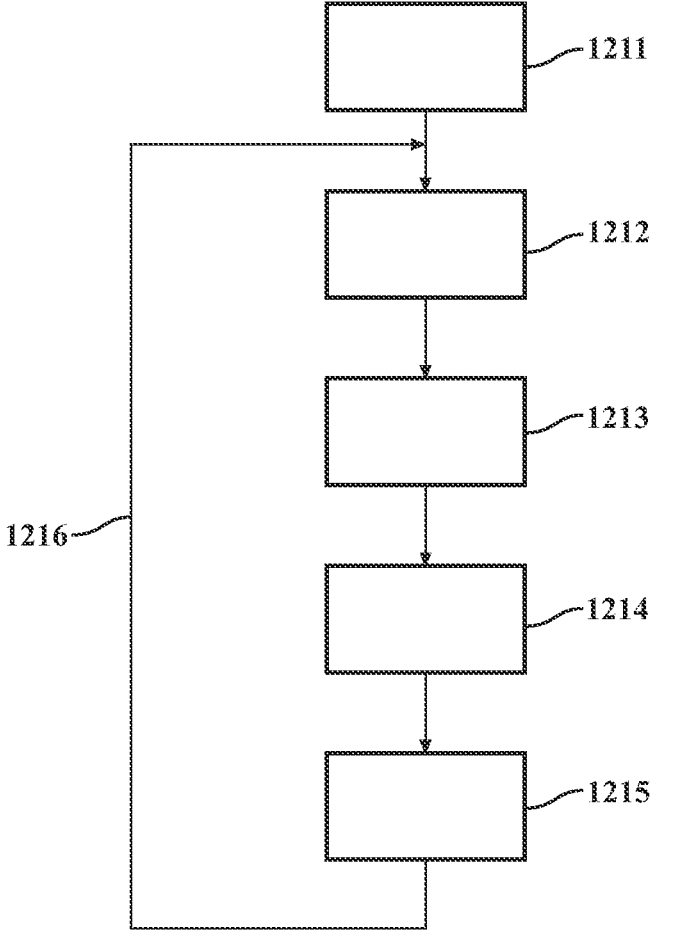
FIG. 15 displays further steps of the first sub-step of the method shown in FIG. 14.

The control system 4 may be configured to perform a controlled brake application in response to processing the first binary number 71. Performing the controlled brake application may be considered as one variation of performing the above mentioned first sub-step 1210. A performing of the controlled brake application may include the following further steps, which are shown in FIG. 15.

In a first further step 1211, the control system 4 may define an object in front of which the vehicle 2 is supposed to be halted. This object may be also referred to as target object in the following. The control system 4 may define the target object dependent on the sensor data. For example, the control system 4 may check whether the images generated by the camera system 92 may include the traffic light 6, particularly the housing 9, the supporting device 7 and/or the switched on red bulb 11. If this is the case, then the control system 4 may define the traffic light 6, the housing 9, the supporting device 7 or the switched on red bulb 11 as the target object.

The control system 4 may apply a pattern recognition module for checking whether an object that is illustrated on at least one of the images resembles a comparative image of an exemplary traffic light or resembles a part of the comparative image in order to recognize the traffic light 6, the housing 9, the supporting device 7 and/or the switched on red bulb 11. The part of the comparative image may illustrate an exemplary housing, supporting device and/or bulb of the exemplary traffic light. If the traffic light 6, the housing 9, the supporting device 7 and/or the switched on red bulb 11 is recognized, then the control system 4 may define the recognized object as the target object. The comparative image may be stored in a database of the control system 4. This database is not shown in the figures.

In particular, the control system 4 may initiate an application of the pattern recognition module for defining the target object in response to reading the first binary number 71.

The term "module" as used herein refers to any known or in the future developed hardware, software such as an executable program, artificial intelligence, fuzzy-logic or combination hereof for performing a function associated with the "module" or being a result of having performed the function associated with the "module". For example, the pattern recognition module may include one or more neuronal nets for performing image classifications using the comparative image.

In a second further step 1212, a distance between the target object and the vehicle 2, in the following also referred as braking distance, may be determined. The control system 4 may determine the braking distance dependent on the radar signals and/or the lidar signals. In particular, the control system 4 may control the lidar system 91 and/or the radar system 93 such that the lidar system 91 and/or the radar system 93 is directed to the target object. The control system 4 may use the images for identifying a segment of a circle in front of the vehicle 2 within which the target object is located. The control system 4 may control the lidar system 91 and/or the radar system 93 such that the lidar system 91 and/or the radar system 93 scan the identified segment of the circle.

In a third further step 1213, the control system 4 may determine a target progression of the velocity of the vehicle 2 over time dependent on the braking distance and the velocity of the vehicle 2. The term "velocity of the vehicle 2" may specify a current velocity of the vehicle 2 in this disclosure. The target progression of the velocity of the vehicle 2 over time may begin at a current point of time, for example at the first point of time 81, and may end at a third point of time 83 at which the vehicle 2 is supposed to stop. It is understood that the target progression of the velocity of the vehicle 2 is designed such that the velocity of the vehicle 2 is zero at the third point of time 83.

In a fourth further step 1214, the control system 4 may calculate the above mentioned brake torque setpoint dependent on the velocity of the vehicle 2 and dependent on the target progression of the velocity of the vehicle 2.

In a fifth further step 1215, the control system 4 may send the calculated brake torque setpoint to the brake control unit 97. Furthermore, in the fifth further step 1215, the brake control unit 97 may control the brake system 96 such that the current break torque of the brake system 96 matches the brake torque setpoint.

The further steps 1212, 1213, 1214 and 1215 may be repeated one after the other by performing a control loop 1216. The control system 4 may repeat the performing of the control loop 1216 until the vehicle 2 stops in front of the target object. The progression of the brake torque setpoint 122 over time may be considered as a result of repeating the performing of the control loop 1216 several times.

In one example, the performing of the brake application may include a further time span between a second point of time 82 and the third point of time 83. During the further time span, a decrease of the velocity of the vehicle 2 is much less than during a second further time span between the first point of time 81 and the second point of time 82, as shown in FIG. 13. At the end of the further time span the vehicle 2 is in a crawling mode. In one example, the traffic light 6, in particular the housing 9, the supporting device 7 or the switched on red bulb 11, may be defined as the target object between the first point of time 81 and the second point of time 82.

According to one example, the control system 4 may detect the stop line 12 at the second point of time 82 dependent on the lidar signals and/or the images generated by the camera system 91. However, at the first point of time 81, the stop line 12 may not be recognizable by the lidar signals because the vehicle 2 is located further away from the stop line 12 at the first point of time 81 compared to the second point of time 82. In response to recognizing the stop line 12, the control system 4 may define the stop line 12 as the target object instead of the traffic light 6 and may then perform further repetitions of the control loop 1216 until the vehicle 2 stops in front of the stop line 12.

As the stop line 12 is located at a distance from the traffic light 6 in the opposite direction of travel, the braking distance may abruptly decrease when performing the control loop 1216 using the stop line 12 as the target object for the first time. As a consequence, the calculated brake torque setpoint may increase during the further time span as indicated in FIG. 12. Thus, the progression of the brake torque setpoint 122 over time may have a further peak, as shown in FIG. 12, while performing the brake application.

At the third point of time 83, the vehicle 2 is stopped and therefore the velocity of the vehicle 2 is zero, as shown in FIG. 13 (e.g., stopped vehicle). The brake torque setpoint is higher than zero in order to keep the vehicle 2 stopped between the third point of time 83 and the transition point 43, at which the current phase switches from the red phase to the green phase.

At the transition point 43, the second time span 42 begins and the first transmitter 8 starts sending out the second message 202 repeatedly within the second time intervals 22. The receiver 3 may receive the second message 202 and may send the second message 202 or the second binary number 72 to the control system 4. In response to receiving the second message 202 or the second binary number 72, the control system 4 may process the second binary number 72. A processing of the second binary number 72 may involve calculating the drive torque setpoint, and sending the drive torque setpoint to the drive control unit 95. The drive control unit 95 may then control the drive unit 94 dependent on the drive torque setpoint such that the drive unit 94 generates the drive torque equal to the drive torque setpoint. In one example, the control system 4 may calculate the drive torque setpoint dependent on the lidar signals and/or the radar signals in order to take into account further objects which might be located on the intersection.

In response to applying the drive torque to the rear wheels 99, the vehicle 2 may accelerate after the transition point 43, as indicated by the progression of the velocity of the vehicle 132. The second chart 100 may show the progression of the stop line distance 102 according to which the stop line distance increases after the transition point 43. The second chart 100 shows the progression of the stop line distance 102 in the form of an absolute value. The brake torque setpoint may be equal to zero during the second time span 42.

Referring now to the second use case, the vehicle 2 may enter the reception zone within the second time span 42 during which the current phase is the green phase. In this case, the receiver 3 may receive the second message 202 from the first transmitter 8. According to the second use case, the receiver 3 may not receive the first message 201 in the first place. As the current phase is the green phase, the vehicle 2 does not need to stop in front of the traffic light 6. In response to receiving the second message 202, the receiver 3 may send the second message 202 or the second binary number 72 to the control system 4. The control system 4 may include or be an adaptive cruise control system that activates an adaptive cruise control algorithm (ACC-algorithm) in response to reading and processing the second binary number 72. According to one example, the control system 4 may already perform the ACC-algorithm while entering the reception zone. Performing the ACC-algorithm may involve controlling the velocity of the vehicle 2 such that the vehicle 2 travels at the target velocity in one example (e.g., a velocity control algorithm).

The above described variant of how the first sub-step 1210 and the second sub-step 1220 may be performed by the driver assistance system 1, and in particular by the control system 4, may be realized in the same manner by the driver-assistance system 1, and in particular by the control system 4, wherein when the first message 201 and the second message 202 is transmitted by=the second transmitter 14 as shown in FIG. 3. The main difference between the variant according to FIG. 2 and the variant according to FIG. 3 is that the reception zone is located further away from the traffic light 6 in the opposite direction of travel in the variant according to FIG. 3. As a consequence, the receiver 3 may receive the first message 201 or the second message 202 earlier compared to the variant according to FIG. 2. This has the advantage that the drive torque setpoint may be reduced to zero earlier compared to the variant according to FIG. 2. By that, fuel can be saved and the efficiency of the vehicle 2 can be increased.

The driver-assistance system 1, as shown in FIG. 2, and the traffic light 6, including the traffic light control unit 5 and first transmitter 8, as shown in FIG. 2, together may be considered as a first traffic control system 401. The driver-assistance system 1, as shown in FIG. 3, and the traffic light 6, including the traffic light control unit 5 as shown in FIG. 3, and second transmitter 14 together may be considered as a second traffic control system 402. Both traffic control systems 401, 402 may be arranged to control a traffic of various vehicles, including the vehicle 2, such that each vehicle, including the vehicle 2, may receive the information about the current phase of the traffic light 6 by receiving either the first message 201 or the second message 202 when entering the reception zone. The vehicles may pass the traffic light 6 one after the other.

Each vehicle may be equipped with a respective driver-assistance system similar to the driver-assistance system 1 for controlling the velocity of the respective vehicle similar to the above described controlling of the velocity of the vehicle 2. This may enhance the efficiency of the vehicles and therefore the traffic of these vehicles and may reduce carbon dioxide emissions. The second traffic control system 402 may enhance the efficiency of the vehicles and therefore the traffic of these vehicles and a reduction of carbon dioxide emissions to a higher extend compared to the first traffic control system 401 as the respective vehicle, in particular the vehicle 2, may receive the first message 201 or the second message 202 earlier which allows the respective driver-assistance system of the respective vehicle, in particular the driver-assistance system 1 of the vehicle 2, to react faster to the information about the current phase provided by the first message 201 or the second message 202.

Figure 16:
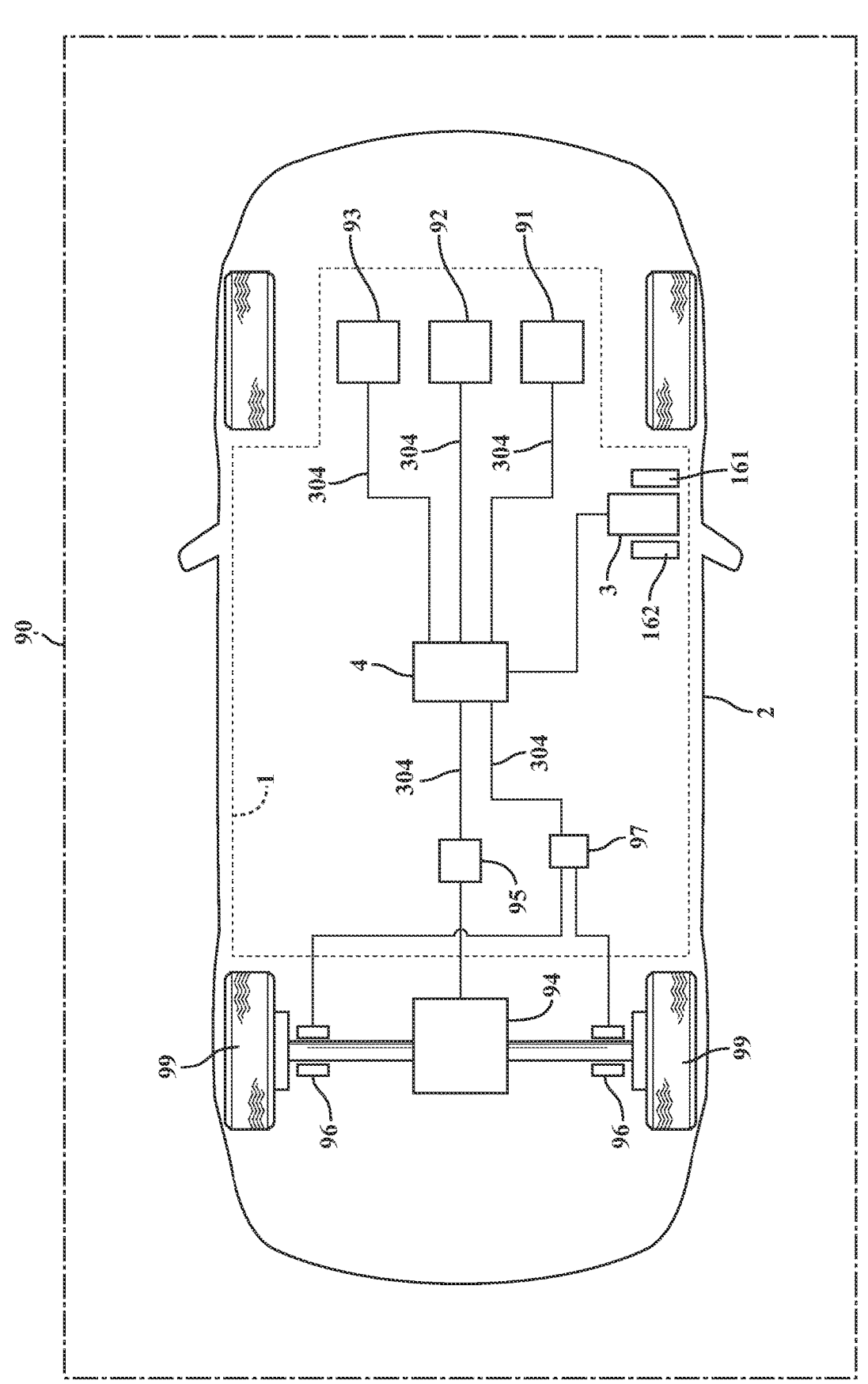
FIG. 16 depicts a further variant of the vehicle shown in FIG. 1 or FIG. 9 including shields for covering a receiver of the driver-assistance system shown in FIG. 1 or FIG. 9.

FIG. 16 depicts a further variant of the vehicle 2 and a variant of the driver-assistance system 1 shown in FIG. 9. In addition to the variant shown in FIG. 9, the variant of the driver-assistance system 1 shown in FIG. 9 includes a first shielding element 161 covering a first part of the receiver 3 that is oriented to the front of the vehicle 2 for reducing a strength of first further radio signals coming from a first zone that is located in front of the vehicle 2. This may enhance a certainty about the fact that the radio signals received by the receiver 3 are transmitted from the second transmitter 14 and not from a further transmitter not shown in the figures. The further transmitter may be located on a further roadside of a further road crossing the road 10 at the intersection where the traffic light 6 is located.

In addition, the variant of the driver-assistance system 1 shown in FIG. 9 may include a second shielding element 162 covering a second part of the receiver 3 that is oriented to the back of the vehicle 2 for reducing a strength of second further radio signals coming from a second zone that is located in the back of the vehicle 2. This may enhance a certainty about the fact that the radio signals received by the receiver 3 are transmitted from the second transmitter 14 and not from one of the further vehicles not shown in the figures. In FIG. 16, a variant of the driver-assistance system 1 is illustrated according to which the first and the second shielding element 161, 162 are mounted around the receiver 3. However, in a further example not shown in the figures, only one of the shielding elements 161, 162, for example the first shielding element 161, may cover the receiver 3.

Figure 17:
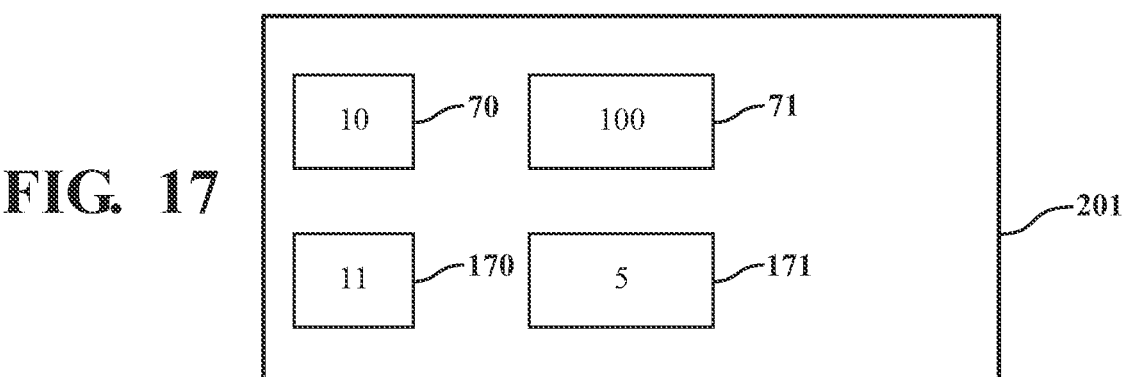
FIG. 17 demonstrates a further variant of the first message shown in FIG. 7 including an information about a remaining duration of the red phase.

FIG. 17 depicts a further example of the first message 201 according to which the first message 201 includes an information about a remaining duration of the red phase 171, which is an example of the above mentioned red phase information and is referred to as red phase information 171 in the following. The second message 201 may also include a second identifier 170 for identifying the red phase information 171 as the information about the remaining duration of the red phase.

According to the example shown in FIG. 17, the red phase information 171 may be provided in the form of the third single value mentioned above, indicating the remaining duration of the red phase. The unit of the third single value may be seconds. Thus, according to the example shown in FIG. 17, the remaining duration of the red phase is 5 seconds at a moment at which the receiver 3 receives the first message 201. In response to receiving the first message 201, the receiver 3 may send the first message 201, including the red phase information 171, or only the red phase information 171 to the control system 4. The control system 4 may control the velocity of the vehicle 2 dependent on the remaining duration of the red phase. In one example, the control system 4 may design the above mentioned target progression of the velocity of the vehicle 2 such that the vehicle 2 reaches the stop line 12 at the transition point 43. Particularly, the control system 4 may calculate the target progression of the velocity such that the average velocity of the vehicle mentioned above is less than the quotient of the stop line distance as the dividend and the remaining duration of the red phase as the divisor.

Figure 18:
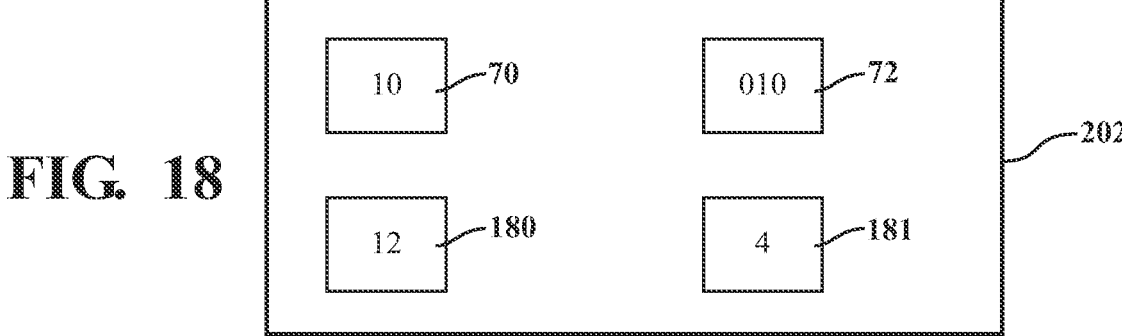
FIG. 18 depicts a further variant of the second message shown in FIG. 8 including an information about a remaining duration of the green phase.

FIG. 18 depicts a further example of the second message 202 according to which the second message 202 includes an information about a remaining duration of the green phase 181, which is an example of the above mentioned green phase information and is referred to as green phase information 181 in the following. The second message 202 may also include a third identifier 180 for identifying the green phase information 181 as the information about the remaining duration of the green phase.

According to the example shown in FIG. 18, the green phase information 181 may be provided in the form of the first single value mentioned above, indicating the remaining duration of the green phase. The unit of the first single value may be seconds. Thus, according to the example shown in FIG. 18, the remaining duration of the green phase is 4 seconds at a moment at which the receiver 3 receives the second message 202. In response to receiving the second message 202, the receiver 3 may send the second message 202, including the green phase information 181, or only the green phase information 181 to the control system 4. The control system 4 may control the velocity of the vehicle 2 dependent on the remaining duration of the green phase.

In one example, the control system 4 may design the above mentioned target progression of the velocity of the vehicle 2 such that the vehicle 2 reaches the stop line 12 when the current phase is still the green phase. Particularly, the control system 4 may calculate the target progression of the velocity such that the average velocity of the vehicle mentioned above is greater than the quotient of the stop line distance as the dividend and the remaining duration of the green phase as the divisor.

A period of time between a transmission of the first message 201 by the first transmitter 8 or the second transmitter 14 and a reception of the first message 201 by the receiver 3 may be in the range of milliseconds. The same may apply to the second message 202.

Figure 19:
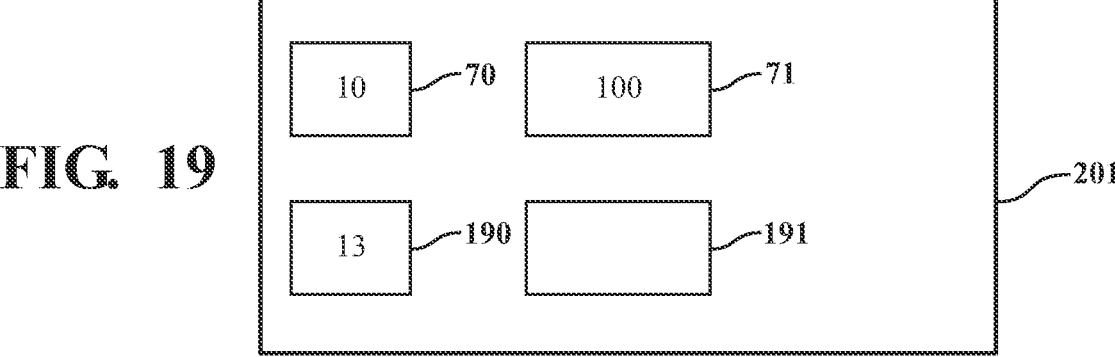
FIG. 19 depicts a further variant of the first message shown in FIG. 7 including an information about local map data specifying an environment of the traffic light shown in FIG. 2 or FIG. 3.

FIG. 19 depicts a further example of the first message 201 according to which the first message 201 includes local map data 191 specifying dimensions of an environment of the traffic light 6. For example, the local map data 191 may contain an information about a distance between the stop line 12 and the traffic light 6 and/or the above-mentioned roadside unit distance. The first message 201 may also include a fourth identifier 190 for identifying the local map data 191 as local map data of environment of the traffic light 6. It is understood that the second message 202 may include the local map data 191 analogously to the first message 201 using the fourth identifier 190 for identifying the local map data 191 as local map data of environment of the traffic light 6. For sake of simplicity this is not shown in the figures.

The control system 4 may correct the braking distance dependent on the distance between the stop line 12 and the traffic light 6 given by the local map data 191.

According to the example of the first use case described so far, the corrected braking distance may be a difference between the distance between the vehicle 2 and the traffic light 6 at the first point of time 81 and the distance between the stop line 12 and the traffic light 6. The control system 4 may determine the corrected braking distance in the second further step 1212, when performing the second further step 1212 for the first time wherein when the first message 201 includes the local map data 191.

Furthermore, in the third further step 1213, the control system 4 may determine the target progression of the velocity of the vehicle 2 over time dependent on the corrected braking distance and the velocity of the vehicle 2, in the following also referred to as corrected target progression of the velocity of the vehicle 2, wherein when the first message 201 includes the local map data 191.

In the fourth further step 1214, the control system 4 may calculate the brake torque setpoint dependent on the velocity of the vehicle 2 and dependent on the corrected target progression of the velocity of the vehicle 2 wherein when the first message 201 includes the local map data 191. As the corrected target progression of the velocity of the vehicle 2 is calculated on the basis of the corrected braking distance, several repetitions of the loop 1216 using the corrected braking distance may result in a corrected progression of the brake torque setpoint 123 over time as shown in FIG. 12 in the form of a dashed line wherein when the first message 201 includes the local map data 191. Operating the brake system 96 using the corrected progression of the brake torque setpoint 123 may increase the efficiency and the comfort of the brake application. This may be one advantage of including the local map data 191 in the first message 201. In one example, the comfort of the brake application may be enhanced by the fact that the corrected progression of the brake torque setpoint 123 only includes one peak instead of several peaks, as shown in FIG. 12. This may be achieved by using the corrected braking distance by using the local map data 191, as described above.

The receiver 3 may be adapted for receiving the local map data 191 in such a way that a processing unit of the receiver 3, not shown in the Figures, may be programmed to recognize the local map data 191 as local map data of the environment of the traffic light 6. For example, the processing unit of the receiver 3 may be programmed to check whether the first message 201 contains the third identifier 190. In the example according to FIG. 19, the processing unit of the receiver 3 may check whether the first message 201 contains the value "13" in the beginning of one of the lines of the first message 201 in order to search for the third identifier 190.

Figure 20:
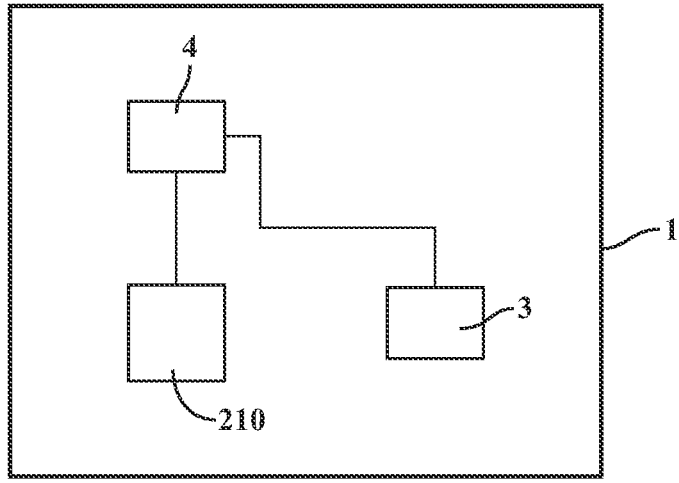
FIG. 20 depicts a further variant of the driver-assistance system shown in FIG. 1, FIG. 9 or FIG. 16.

FIG. 20 depicts a further example of the driver-assistance system 1, according to which the driver-assistance system 1 may include a GPS receiver 210 for generating differential GPS data for specifying a GPS position of the vehicle 2. According to this example, the receiver 3 may be configured to receive information about a GPS position of the traffic light 6 or information about a GPS position of the roadside unit 16. In one example, the control system 4 may be configured to calculate the stop line distance, the braking distance, dependent on the GPS position of the traffic light 6 and the differential GPS data wherein when the receiver 3 receives the information about the GPS position of the traffic light 6. The target object may be the traffic light 6, the housing 9, the supporting device 7 or the switched on red bulb 11 in this case.

In another example, the control system 4 may be configured to calculate the stop line distance, in particular the braking distance, dependent on the GPS position of the roadside unit 16 and the differential GPS data and the local map data 191 wherein when the receiver 3 receives the information about the GPS position of roadside unit 16. The local map data 191 may include information about the distance between the traffic light 6 and the roadside unit 16 (i.e. the roadside unit distance).

In many use cases, calculating the stop line distance, in particular the braking distance, dependent on the differential GPS data and the information about the GPS position of the traffic light 6 or the roadside unit 16 may result in a more accurate value of the stop line distance, in particular the braking distance, compared to a method according to which the stop line distance, in particular the braking distance, is calculated based on the radar signals and/or the lidar signals. Hence, the brake application may be performed safer and/or with a higher comfort.

Figure 21:
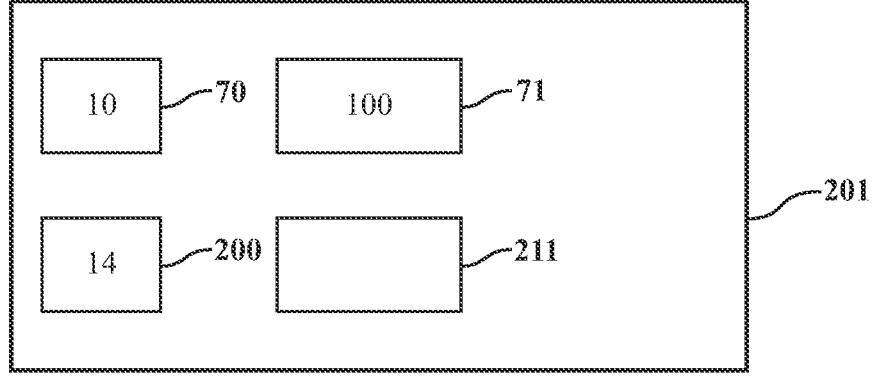
FIG. 21 represents a further variant of the first message shown in FIG. 7 including an information about a GPS position of the traffic light shown in FIG. 2 or FIG. 3 or an information about a GPS position of the roadside unit shown in FIG. 3.

FIG. 21 depicts a further example of the first message 201 according to which the first message 201 includes the information about the GPS position of the traffic light 6 or the information about the GPS position of the roadside unit 16, indicated as GPS information 211 in FIG. 21. The first message 201 may also include a fifth identifier 200 for identifying the GPS information 211 as GPS information. In one example, the fifth identifier 200 may also specify if the GPS information 211 indicates the GPS position of the traffic light 6 or the roadside unit 15. It is understood that the second message 202 may include the GPS information 211 analogously to the first message 201 using the fifth identifier 200 for identifying the GPS information 211 as GPS information. For sake of simplicity this is not shown in the figures.

Similar to the first identifier 70, the second identifier 170, the third identifier 180, the fourth identifier 190 and the fifth identifier 200 may each be designed in the form of a prescribed value, for example, the value "11" as indicated in FIG. 17 and the value "12" as indicated in FIG. 18 and the value "13" as indicated in FIG. 19 and the value "14" as indicated in FIG. 21 respectively. The value of the second identifier 170, the third identifier 180, the fourth identifier 190 and the fifth identifier 200 may each be prescribed according to the exemplary short-range communication standard described above. The values "10", "11", "12", "13 and "14" may only have exemplary character to illustrate that the identifiers 70, 170, 180, 190 and 200 may be specified using numeric values. According to a further example, these identifiers may be specified by characters.

The control system 4, the lidar system 91, the camera system 92, the radar system 93, drive control unit 95 and the brake control unit 97 as a whole may be considered as an example of the above mentioned ACC-system. The ACC-system may be arranged to perform the above mentioned ACC-algorithm. According to one example, the second step 1200, particularly the sub-steps 1211, 1212, 1213, 1214 and 1215 and the control loop 1216 may be performed by using the ACC-algorithm. In this case, the ACC-algorithm may use the above described calculated braking distance instead of a further braking distance which may be a distance between a vehicle 2 and a fictitious vehicle. Furthermore, the ACC-algorithm may use a velocity of the fictitious vehicle that is equal to zero for realizing the second step of the method.

Normally, the ACC-algorithm would control the vehicle 2 such that the vehicle 2 brakes behind the fictitious vehicle. However, as the above described calculated braking distance is used instead of the further braking distance and the velocity of the fictitious vehicle is equal to zero this may result in the vehicle 2 stopping in front of the target object when executing the ACC-algorithm on the processor of the control system 4.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A driver-assistance system for controlling a velocity of a vehicle, the driver-assistance system comprising:
   a receiver configured to:
     receive traffic light data generated by a traffic light control unit for controlling a traffic light, and
     receive a local map data specifying an environment of the traffic light, the local map data being data of at least one of a dimension of a stop line, a distance between the stop line and the traffic light, or a width of a road on which the vehicle drives to the traffic light; and
   a control system configured to:
     calculate a length of a driving path to the traffic light dependent on the local map data;
     control the velocity of the vehicle dependent on the length of the driving path;
     control the velocity of the vehicle dependent on the traffic light data, wherein the traffic light data indicates a current phase of the traffic light,
     control the velocity of the vehicle dependent on the traffic light data such that the vehicle stops in front of the traffic light wherein when the current phase of the traffic light is a red phase, and
     control the velocity of the vehicle dependent on the traffic light data such that the vehicle reaches a prescribed target velocity wherein when the current phase of the traffic light is a green phase.

2. The driver-assistance system according to claim 1, wherein:
   the traffic light data further comprises:
     an information about a remaining duration of the green phase wherein when the current phase of the traffic light is the green phase or an information about a remaining duration of the red phase wherein when the current phase of the traffic light is the red phase; and
   the control system is further configured to control the velocity of the vehicle dependent on the remaining duration of the green phase wherein when the current phase of the traffic light is the green phase or dependent on the remaining duration of the red phase wherein when the current phase of the traffic light is the red phase.

3. The driver-assistance system according to claim 1, wherein the receiver is configured to receive the traffic light data using a short-range communication standard.

4. The driver-assistance system according to claim 1, wherein the receiver is configured to receive the traffic light data from a roadside unit wherein when the receiver passes by the roadside unit.

5. The driver-assistance system according to claim 1, further comprising:
   a GPS receiver for generating differential GPS data for specifying a GPS position of the vehicle;
   the receiver is configured to receive information about a GPS position of the traffic light or a roadside unit;
   the control system is configured to:
     calculate a distance between the vehicle and the traffic light or the roadside unit using the information about the GPS position of the traffic light or the roadside unit and the differential GPS data, and
   control the velocity of the vehicle dependent on the calculated distance.

6. A driver-assistance system according to claim 1, further comprising:
   an adaptive cruise control system configured to stopping the vehicle behind a stopped vehicle by executing the velocity control algorithm; and
   the control system is configured to:
     initiate a velocity control algorithm of the adaptive cruise control system in order to stop the vehicle in front of the traffic light wherein when the current phase of the traffic light is the red phase, and
     send at least a part of the traffic light data or further data generated dependent on the traffic light data to the adaptive cruise control system,
   wherein the adaptive cruise control system is configured to execute the velocity control algorithm dependent on the traffic light data or the further data in order to stop the vehicle in front of the traffic light wherein when the current phase of the traffic light is the red phase.

7. The driver-assistance system according to claim 1, wherein the local map data being data including each of the dimension of the stop line, the distance between the stop line and the traffic light, and the width of the road on which the vehicle drives to the traffic light.

8. A traffic control system comprising:
   a driver-assistance system for controlling a velocity of a vehicle, the driver-assistance system having a receiver and a control system;
   a traffic light having a traffic light control unit for controlling the traffic light; and
   a roadside unit with a transmitter, the roadside unit is arranged at a distance from the traffic light in the opposite direction of travel and the transmitter is configured to send traffic light data generated by the traffic light control unit for controlling the traffic light, the traffic light data indicates a current phase of the traffic light,
   wherein:
     the receiver is configured to:
       receive the traffic light data from the transmitter, and
       receive a local map data specifying an environment of the traffic light, the local map data being data of at least one of a dimension of a stop line, a distance between the stop line and the traffic light, or a width of a road on which the vehicle drives to the traffic light, and
     the control system is configured to:
       calculate a length of a driving path to the traffic light dependent on the local map data,
       control the velocity of the vehicle dependent on the length of the driving path,
       control the velocity of the vehicle dependent on the traffic light data such that the vehicle stops in front of the traffic light wherein when the current phase of the traffic light is a red phase, and
       control the velocity of the vehicle dependent on the traffic light data such that the vehicle reaches a prescribed target velocity wherein when the current phase of the traffic light is a green phase.

9. The traffic control system according to claim 8, wherein the local map data being data including each of the dimension of the stop line, the distance between the stop line and the traffic light, and the width of the road on which the vehicle drives to the traffic light.

10. A method for controlling a velocity of a vehicle by a driver-assistance system, wherein the driver-assistance system includes a receiver and a control system, the method comprising the following steps:

receiving traffic light data generated by a traffic light control unit for controlling a traffic light by the receiver, wherein the traffic light data indicates a current phase of the traffic light; receiving a local map data specifying an environment of the traffic light by the receiver, the local map data being data of at least one of a dimension of a stop line, a distance between the stop line and the traffic light, or a width of a road on which the vehicle drives to the traffic light;

calculating a length of a driving path to the traffic light dependent on the local map data by the control system;

controlling the velocity of the vehicle dependent on the length of the driving path by the control system; and controlling the velocity of the vehicle dependent on the traffic light data by the control system such that the vehicle stops in front of the traffic light wherein when the current phase of the traffic light is a red phase or controlling the velocity of the vehicle dependent on the traffic light data such that the vehicle reaches a prescribed target velocity wherein when the current phase of the traffic light is a green phase.

11. The method according to claim 10, wherein the local map data being data including each of the dimension of the stop line, the distance between the stop line and the traffic light, and the width of the road on which the vehicle drives to the traffic light.

12. A non-transitory, computer-readable storage medium that is operable by a computer, the non-transitory, computer-readable storage medium comprising one or more programming instructions stored thereon for causing one or more processors to:

receive traffic light data generated by a traffic light control unit for controlling a traffic light by the receiver, wherein the traffic light data indicates a current phase of the traffic light; receive a local map data specifying an environment of the traffic light by the receiver, the local map data being data of at least one of a dimension of a stop line, a distance between the stop line and the traffic light, or a width of a road on which the vehicle drives to the traffic light;

calculate a length of a driving path to the traffic light dependent on the local map data by the control system;

control the velocity of the vehicle dependent on the length of the driving path by the control system; and control the velocity of the vehicle dependent on the traffic light data by the control system such that the vehicle stops in front of the traffic light wherein when the current phase of the traffic light is a red phase or controlling the velocity of the vehicle dependent on the traffic light data such that the vehicle reaches a prescribed target velocity wherein when the current phase of the traffic light is a green phase.

13. The non-transitory, computer-readable storage medium according to claim 12, wherein the local map data being data including each of the dimension of the stop line, the distance between the stop line and the traffic light, and the width of the road on which the vehicle drives to the traffic light.

* * * * *